(12) United States Patent
Coleman et al.

(10) Patent No.: US 7,581,703 B1
(45) Date of Patent: Sep. 1, 2009

(54) RADIAL TRIPOD STABILIZER

(76) Inventors: David Harold Coleman, P.O. Box 417839, Sacramento, CA (US) 95841-7839; Risto A. Rinne, Jr., 2173 E. Francisco Blvd., Suite E, San Rafael, CA (US) 94901

( * ) Notice: Subject to any disclaimer, the term of this patent is extended or adjusted under 35 U.S.C. 154(b) by 86 days.

(21) Appl. No.: 11/714,623

(22) Filed: Mar. 5, 2007

(51) Int. Cl.
*F16M 11/00* (2006.01)
(52) U.S. Cl. .................................. 248/163.2; 248/188
(58) Field of Classification Search .............. 248/440, 248/163.2, 158, 188, 188.1, 188.91, 432, 248/346.07, 163.1, 431; 396/419, 421, 428; 40/606.01, 606.03
See application file for complete search history.

(56) References Cited

U.S. PATENT DOCUMENTS

| | | | | |
|---|---|---|---|---|
| 2,547,924 A | * | 4/1951 | Citro | 84/327 |
| 4,691,444 A | * | 9/1987 | Capps | 33/290 |
| 4,905,946 A | * | 3/1990 | Wang | 248/170 |
| 5,485,978 A | * | 1/1996 | Hernandez | 248/165 |
| 6,467,738 B1 | * | 10/2002 | Hedrick et al. | 248/164 |
| 7,207,533 B1 | * | 4/2007 | Coleman et al. | 248/188.2 |

* cited by examiner

*Primary Examiner*—A. Joseph Wujciak, III
(74) *Attorney, Agent, or Firm*—Risto A. Rinne, Jr.

(57) ABSTRACT

An apparatus for increasing the stability of a tripod includes a centrally placed base member that includes three perimeter leg assemblies, each of which are adapted to cooperate with one of the legs of the tripod. Each of the leg assemblies includes a generally U-shaped member that surrounds a portion of each tripod leg and which cooperates with the base member so that when a portion of each respective leg assembly is tightened, an extension member is urged outward and into contact with an inside surface of one of the legs which, in turn, urges the leg outward until an outside of the leg bears tightly against an inside of the respective U-shaped member. Each tripod leg is accordingly placed under compression eliminating any possible movement thereby. The three forces that urge the legs outward are disposed radially around a center longitudinal axis, each force separated from both adjoining forces by 120 degrees of arc. The U-shaped members include any preferred size or shape and, if preferred, may be attached to the tripod legs.

16 Claims, 4 Drawing Sheets

RADIAL TRIPOD STABILIZER

RELATED APPLICATION

This application is related to currently pending patent application Ser. No. 10/449,161 that was filed on May 30, 2003 entitled "Tripod Stabilizer" by one of the same inventors, and which is currently approved to issue as a patent.

BACKGROUND OF THE INVENTION

1. Field of the Invention

The present invention, in general relates to tripods and, more particularly, to devices that steady a tripod.

As is well known, tripods are used for a variety of purposes. For example, tripods are used to support cameras (both still and motion), telescopes, surveying apparatus, binoculars, transits, and all manner of equipment.

The basic reason a tripod is used is to provide a steadier hold of the equipment placed thereon than could otherwise occur. Hence, the steadier the tripod itself is, the more utilitarian is its functioning. Accordingly, it is desirable to render a tripod as steady as possible during use.

Prior art tripods, in general, allow slack in the precise radial position of the legs to occur. This results in possible movement during use which affects viewing and other uses that demand stillness of support.

Prior stabilizing devices (i.e., tripods) have certain limitations. For example, they rely upon a restraint that typically prevents the legs from extending outward beyond a certain point. Such a restrain is typically placed intermediate the ends of the legs. Then, the legs are either allowed to extend on their own or are forced to extend by some mechanism that is placed at or near to the top of the legs.

While this may help steady the tripod, it also tends to bow (i.e., bend in an arc) the legs outward intermediate the top and the restraint. When the legs are forced to bow by the stabilizing structures of the tripod, they are still apt to move a substantial amount in a direction that tends to either increase the amount of bow that is present or in an opposite direction that tends to decrease the amount of bow in the legs. Such movement detracts from stability.

Ideally, a mechanism that tends to force the legs outward and which also simultaneously prevents them from moving outward without introducing any bow along the longitudinal length of the legs would serve to eliminate substantially all of the slack (i.e., tolerance or play) in the legs. The elimination of slack prevents movement of the legs and this, then, produces the desired increase in stability.

Another problem is that there are many tripods currently being built that do not incorporate any stabilizing device. Accordingly, these types of tripod would especially benefit from tripod stabilizer that includes a retrofit capability.

It is therefore desirable to be able to retrofit a tripod stabilizer for use with currently existing types of tripods.

However, tripods and their legs come in a variety of sizes and cross-sectional configurations, with either a circle, square, rectangular, or other shape in cross-section being among the most common. These dimensions also vary among the different manufacturers and in accordance with the intended purpose of each tripod. For example, the diameter of a circular tripod leg can vary from under one-half of an inch to several inches. Similarly, the width and length of rectangular (or square) tripod legs can vary substantially.

These variations tend to make the use of a retrofit device impractical. Also, there is no known way of adding a retrofit device that provides optimum stability.

Another problem is that the prior types of stabilizing devices tend to make the tripod especially bulky and cumbersome to transport when it is collapsed for portage. To obtain any reasonable degree of stabilization, these prior art types of devices must be designed as an integral component for use with the tripod and therefore they are part of the tripod assembly when it is collapsed for portage. This tends to increase bulk.

Also, prior devices tend to take a long time to set up and disassemble. It is desirable to provide a device that can be quickly attached to virtually any existing or newly manufactured tripod and which will help to ameliorate the above-mentioned problems and difficulties.

Also, certain prior art stabilizing devices tend to damage the legs by scratching, marring, indenting, creasing, or otherwise impacting them. This, also, is not desirable.

Accordingly, there exists today a need for a tripod stabilizer that is adapted to ameliorate the aforementioned problems. In particular, there is need for a tripod stabilizer that does not tend to bow the legs and which is adaptable for use on a variety of different leg cross-sections and diameters, and which can be secured to the tripod with or without any physical connection to the legs.

Clearly, such an apparatus would be a useful and desirable device.

2. Description of Prior Art

Tripods are, in general, known. While the structural arrangements of the known types of devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a radial tripod stabilizer that is adapted for use with new construction tripods.

It is also an important object of the invention to provide a radial tripod stabilizer that is adapted for use with existing types of tripods.

Another object of the invention is to provide a radial tripod stabilizer that is adapted for use with tripods having round or oval shaped legs.

Still another object of the invention is to provide a radial tripod stabilizer that is adapted for use with tripods having square or rectangular shaped legs.

Still yet another object of the invention is to provide a radial tripod stabilizer that is adapted for use with different lengths of legs.

Yet another important object of the invention is to provide a radial tripod stabilizer that is adapted to urge at least one leg in an outward direction and also to simultaneously limit the movement of the leg in the outward direction.

Still yet another important object of the invention is to provide a radial tripod stabilizer that is adapted to urge all three legs in an outward direction and also to simultaneously limit the movement of the three legs in the outward direction.

A first continuing important object of the invention is to provide a radial tripod stabilizer that includes a portion that urges the legs outward and another portion that prevents the legs from being urged outward.

A second continuing important object of the invention is to provide a radial tripod stabilizer that includes a portion that urges the legs outward and another portion that prevents the legs from moving outward and wherein both portions are disposed on the same plane.

A third continuing important object of the invention is to provide a radial tripod stabilizer that includes a portion that urges the legs outward and another portion that prevents the legs from moving outward that are disposed radially with respect to a center vertical axis of a tripod.

A fourth continuing important object of the invention is to provide a radial tripod stabilizer that includes a leg member that is attached to a leg of a tripod and which is adapted to cooperate with the tripod stabilizer.

A fifth continuing important object of the invention is to provide a radial tripod stabilizer that is adapted for use with legs that do not include any members attached thereto that are adapted for use with the stabilizer.

A sixth continuing important object of the invention is to provide a radial tripod stabilizer that is adapted for contact with the legs when an improvement in stability is desired and which can be removed from the legs when the improvement in stability is not desired.

A seventh continuing important object of the invention is to provide a radial tripod stabilizer that does not damage the legs.

An eight continuing important object of the invention is to provide a radial tripod stabilizer that includes a leg member that is adapted to surround a portion of a leg of a tripod and which is adapted to cooperate with the tripod stabilizer.

A ninth continuing important object of the invention is to provide a radial tripod stabilizer that includes a leg member that is included as an integral part of a leg of a tripod and which is adapted to cooperate with the tripod stabilizer.

A tenth continuing important object of the invention is to provide a radial tripod stabilizer that simultaneously applies a force extending a leg and a force compressing the leg of a tripod.

An eleventh continuing important object of the invention is to provide a radial tripod stabilizer that simultaneously applies a first force urging a first side of a leg of the tripod outward and a second force on a second opposite side of the leg urging the leg inward thereby securing the leg in compression and wherein both forces are provided by the same device.

A twelfth continuing important object of the invention is to provide a radial tripod stabilizer that simultaneously applies a first force on a plane urging a first side of a leg of the tripod outward and a second force on the plane that is applied to a second opposite side of the leg urging the leg inward.

A thirteenth continuing important object of the invention is to provide a radial tripod stabilizer that can be used with a first tripod having a first leg of a particular cross-section and which can also be used with a second tripod having a second leg of a different cross-section by using a first U-shaped member that corresponds with a portion of the perimeter shape of the first leg and by using a second U-shaped member that corresponds with a portion of the perimeter shape of the second leg.

Briefly, a radial tripod stabilizer that is constructed in accordance with the principles of the present invention has a generally planar base member that is placed concentrically about a center longitudinal axis that is disposed between the legs of a tripod. The base member is perpendicular with respect to the center longitudinal axis and is disposed at a predetermined height above a ground surface. The base member includes three perimeter leg assemblies, each of which are adapted to cooperate with one of the legs of the tripod. Each of the leg assemblies includes a U-shaped member that surrounds a portion of each tripod leg respectively and then cooperates with the base member so that when a portion of each respective leg assembly is tightened, an extension member is urged outward away from the center longitudinal axis and into contact with an inside surface of one of the legs which, in turn, is then also urged outward until an outside of the respective leg bears tightly against an inside of the respective U-shaped member. The legs are simultaneously prevented from being displaced outward beyond a predetermined distance by the U-shaped members. This puts each leg under a compressive force on opposite sides of the leg, thereby securing each leg to the base member under tension and in a manner that tends to eliminate virtually all of the slack in the legs proximate the radial tripod stabilizer. The force that urges the legs outward is disposed on the same plane as is the force that urges the legs inward and is disposed radially with respect to the center longitudinal axis whereby each leg assembly is disposed 120 degrees radially from each of the remaining two leg assemblies. The U-shaped members include a size and shape that corresponds with that of the tripod legs thereby lessening the possibility of causing damage to any of the tripod legs.

DETAILED DESCRIPTION OF THE INVENTION

Figure 1:
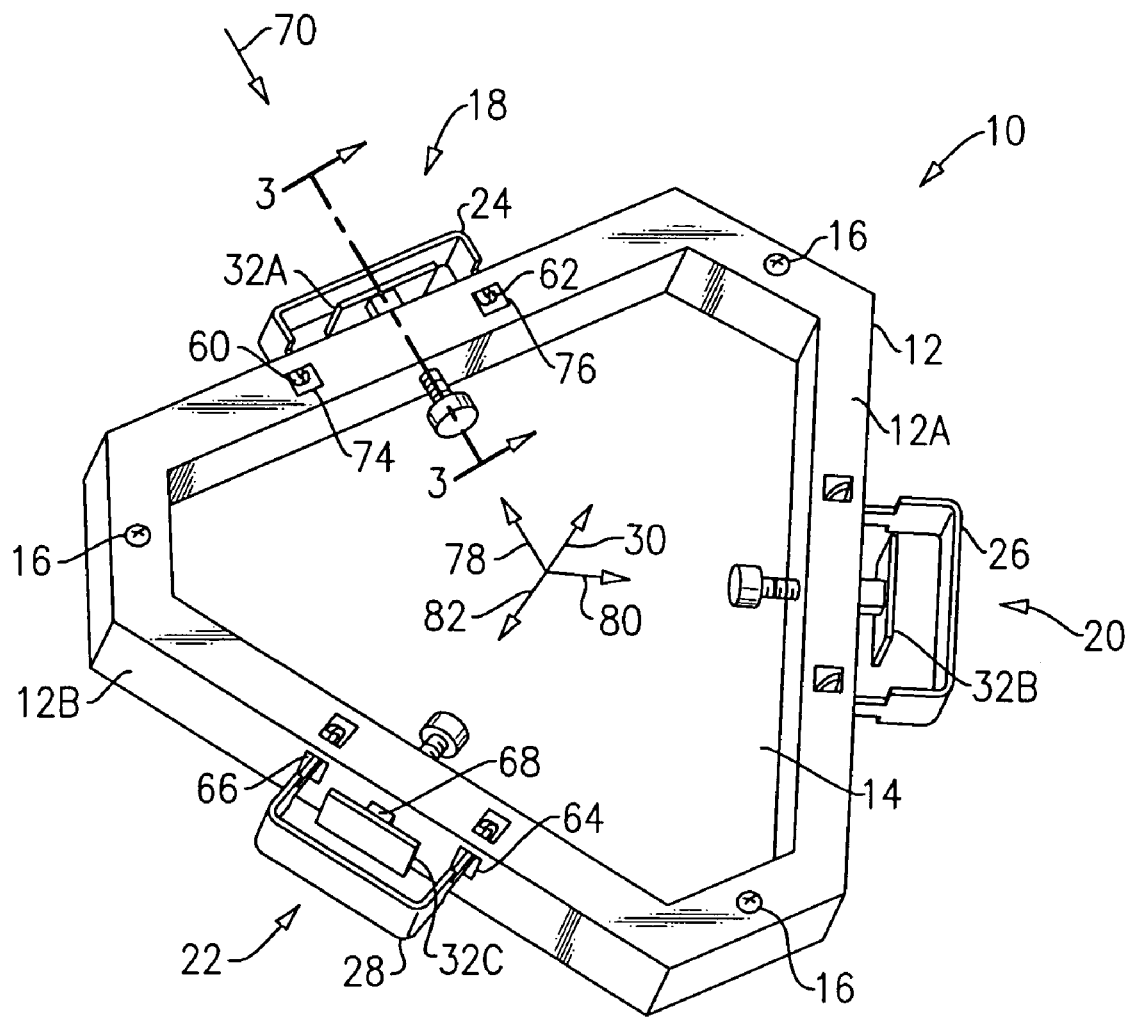
FIG. 1 is a view in perspective of a radial tripod stabilizer.
Figure 2:
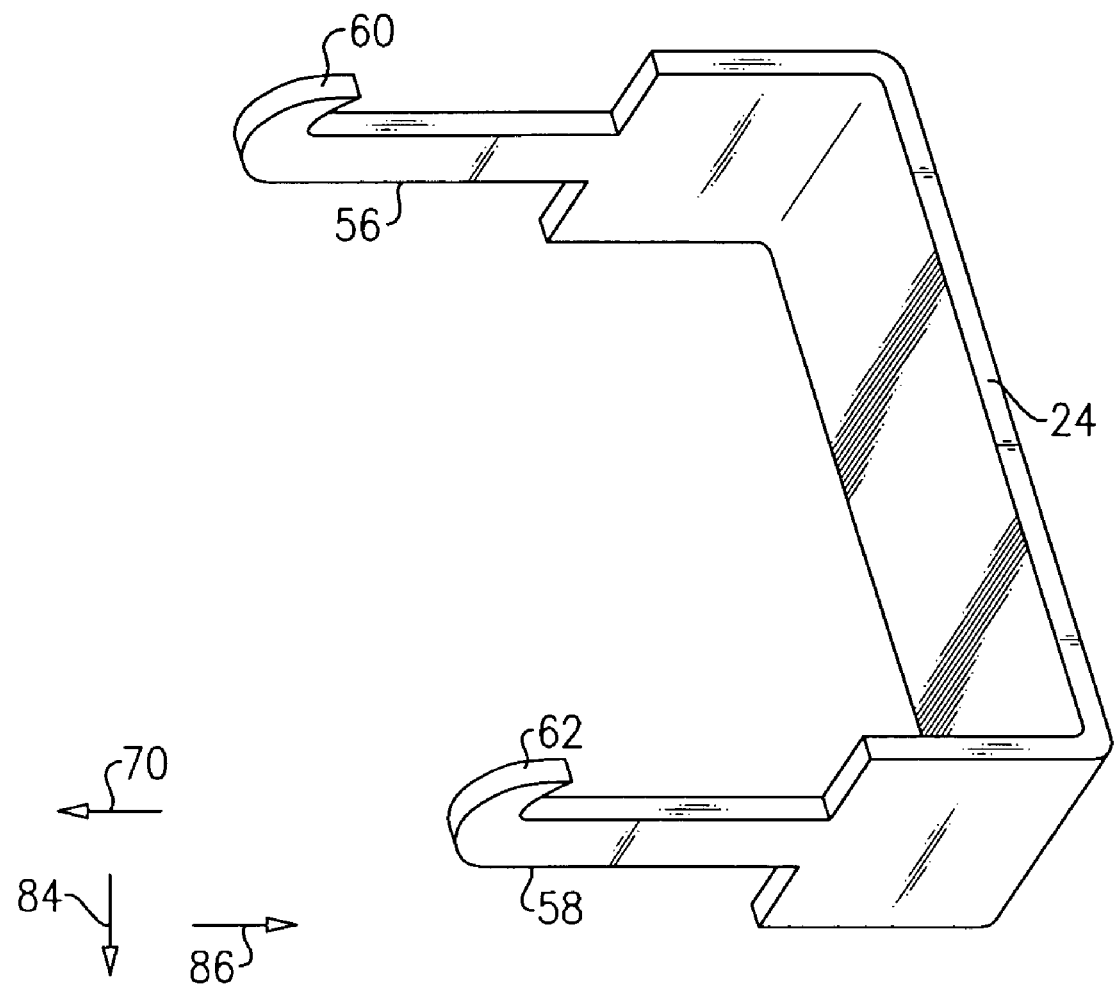
FIG. 2 is a view in perspective of a U-shaped member of FIG. 1, separated for clarity apart from the radial tripod stabilizer.
Figure 3:
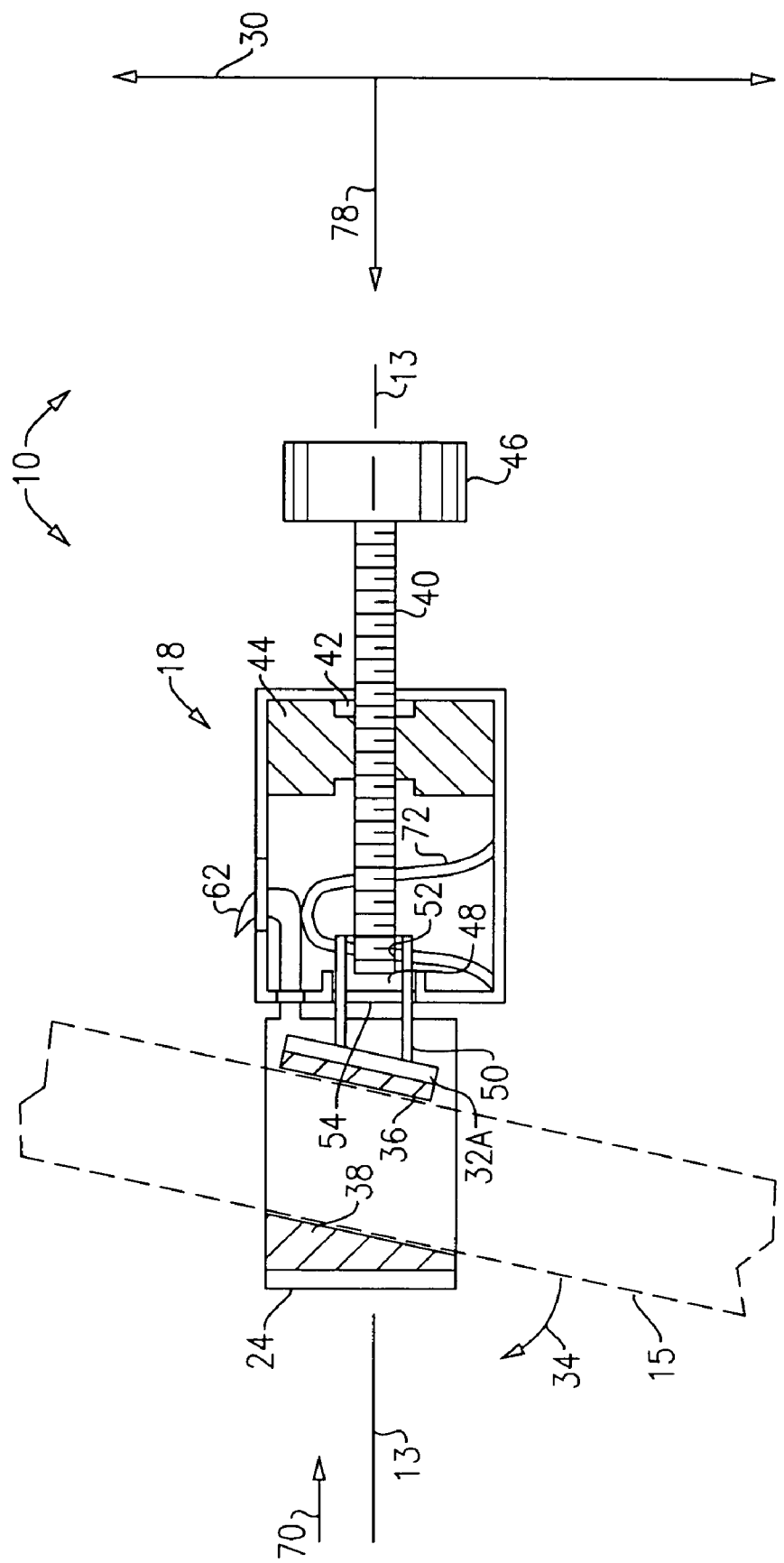
FIG. 3 is a cross sectional view taken on the line 3-3 in FIG. 1 of a first leg assembly and with a leg of a tripod secured thereto.

Referring primarily to FIG. 1 and on occasion also to FIG. 2 and to FIG. 3 is shown, a radial tripod stabilizer, identified in general by the reference numeral 10.

A base member 12 includes a center opening 14. An aesthetically pleasing shape for the base member 12 is as shown, that is a hexagon with alternating long and short segments. The base member 12 includes a suitable thickness that can vary depending on what material it is formed. A preferred material includes a metal, although plastics or composite materials may also be used to form the base 12 or any other portion of the radial tripod stabilizer 10, as desired.

A typical depth for the base member 12 is about one-inch thick or slightly less or slightly more. As such, the base member 12 forms a generally planar structure that includes a plane 13 (FIG. 3) that passes through a center of the entire base member 12. During use, the plane 13 is generally parallel with respect to a ground surface upon which a tripod (not shown) is placed. A portion of a first leg 15 of the tripod is shown in FIG. 3 in dashed lines.

A typical distance across diametrically opposed inside flats in the center opening 14 is about eight inches, although this dimension can also vary, as desired.

A top plate 12a of the base member 12 is used to cover an open inside of the base member 12. If desired, the base member 12 can be molded out of any preferred stock, in which case a greater portion of the inside would be generally filled by whatever material was used to form base member 12 and the top plate 12a could be eliminated or decreased in size. The top plate 12a is secured to a remaining lower portion 12b by screws 16.

A tripod has three legs (including the first leg 15) and during use, each of the three legs are secured, respectively, to a first leg assembly 18, a second leg assembly 20, and a third leg assembly 22 as shown in general by the reference numerals. As each of the leg assemblies 18-22 is identical, the first leg assembly 18 is described in detail as is shown in FIG. 3 and this description applies also for the second and third leg assemblies 20, 22 with one difference that is described in greater detail hereinafter.

A first U-shaped member 24 is detachably-attachable with respect to the base member 12 and wraps around an outside perimeter of the first leg 15 of the tripod. An identical second U-shaped member 26 is detachably-attachable with respect to the base member 12 and wraps around an outside perimeter of the second tripod leg (not shown). An identical third U-shaped member 28 is detachably-attachable with respect to the base member 12 and wraps around an outside perimeter of the third tripod leg (not shown).

A center longitudinal axis 30 extends perpendicular with respect to the surface that the tripod is placed. The center longitudinal axis 30 aligns concentrically with a center longitudinal vertical axis of a center of the tripod, during use. The plane 13 is perpendicular with respect to the center longitudinal axis 30 during use.

Each of the leg assemblies 18, 20, 22 cooperates with the base member 12 so that when an extension assembly of each respective leg assembly 18, 20, 22 is tightened, a corresponding extension member 32a, 32b, 32c is urged outward away from the center longitudinal axis 30 and into contact with an inside surface of one of the legs (15) which, in turn, is then also urged outward, as shown by arrow 34 until an outside of the respective leg (15) bears tightly against an inside of the respective U-shaped member 24, 26, 28.

If preferred, a first cushion 36 is attached to the extension member 32a, 32b, 32c to prevent marring of the leg (15) on an inside surface thereof. If preferred, a second cushion 38 is attached to an inside of each of the U-shaped members 24, 26, 28 to prevent marring of the leg (15) on an inside surface thereof.

A longitudinal axis of each leg (15) of the tripod is disposed at an acute angle with respect to the center longitudinal axis 30 during use. If preferred, the second cushion 38 can include a wedge shape (as shown) so as to better accommodate the acute angle that the leg (15) of the tripod will be disposed at during use. If preferred, the acute angle can be included as part of an interior of each of the U-shaped members 24, 26, 28.

A threaded rod 40 is included with each leg assembly 18, 20, 22 and cooperates with a threaded opening 42 that is provided through the base member 12 at each leg assembly 18, 20, 22 location. The threaded opening 42 is disposed in a block 44 that is attached to the base member 12. A knob 46 is attached to a first end of the threaded rod 40. An opposite second end of the threaded rod 40 includes a circular flange 48 that is disposed in a square hollow channel member 50.

The channel member 50 is attached to the extension member 32a. The circular flange 48 is held captive in the channel member 50 by a lip 52 that is disposed on a first side of the flange 48 and by an intermediate plate 54 that is disposed on an opposite side thereof.

Accordingly, when the knob 46 is tightened the circular flange 48 bears on the intermediate plate 54 which, in turn, pushes the extension member 32a outward and away from the center longitudinal axis 30. Conversely, when the knob 46 is loosened the circular flange 48 bears on the lip 52 which pulls the extension member 32a inward toward the center longitudinal axis 30.

The first U-shaped member 24 includes a main body that includes a generally U-shape thereto. Attached to each opposite parallel side of the U-shaped member 24 is a smaller protruding member 56, 58 that extends from a first end thereof in the same direction as do the opposite parallel sides. A distal end of each of the protruding members 56, 58 terminates in a hook 60, 62.

A pair of protruding member openings 64, 66 are provided for each of the protruding members 56, 58 to enter, beginning with the hook 60, 62, into an outside of the base member 12. Each protruding member opening 64, 66 is disposed on an opposite side of the threaded rod 40 and is generally equidistant therefrom.

A channel member opening 68 is provided in the base member 12. The channel member opening 68 is square and matches the shape of the channel member 50. The channel member opening 68 is slightly larger than the dimensions of the channel member 50.

This allows the channel member 50 to be disposed therein and to be able to slide back and forth longitudinally inside the channel member opening 68. The square shape of the channel member opening 68 and of the channel member 50 prevent the channel member 50 from rotating around a center axis of the threaded rod 40 when the knob 46 is tightened or loosened. This ensures that the first extension member 32a will always properly align with the leg (15).

Of course other shapes are possible for the channel member 50 and the channel member opening 68 that will prevent rotation. If preferred, a spline or keyway (not shown) can be attached to the channel member 50 and a corresponding recess (not shown) can be provided in the channel member opening 68 to prevent rotation of the first extension member 32a.

To install the radial tripod stabilizer to the tripod for use, the base member 12 is placed concentrically about the center longitudinal axis 30, near a lower portion of the tripod after the three U-shaped members 24, 26, 28 have been removed from the base member 12.

The base member 12 is then oriented so that each leg assembly 18, 20, 22 aligns with one of the tripod legs (15). The base member 12 is then urged upward, while the plane 13 thereof is held generally level with respect to the ground surface until the extension member 32a (or the first cushion 36) of each leg assembly 18, 20, 22 is brought into contact with one of the tripod legs (15).

The hook 60, 62 of the U-shaped member 24, 26, 28 (at each leg assembly 18, 20, 22) is then inserted into the protruding member opening 64, 66 by initially pushing each one from the outside of each leg (15) toward the base member 12 and toward the center longitudinal axis 30 in a direction show by arrow 70 (FIGS. 1 & 2). Accordingly, each one of the legs (15) is disposed in a corresponding one of the U-shaped members 24, 26, 28.

As the hooks 60, 62 are simultaneously urged inward into the protruding member openings 64, 66 they are each also urged upward by a leaf spring 72 until each one of the hooks 60, 62 is urged upward and into a corresponding hook opening 74, 76 that is provided in the top plate 12a of the base member 12.

A slight rearward tug in a direction opposite to that of arrow 70 applied to each of the U-shaped members 24, 26, 28 ensures that the hooks 60, 62 will engage with the top plate 12a sufficient to retain the U-shaped members 24, 26 in position. This is repeated for all three leg assemblies 18, 20, 22.

Accordingly, each of the U-shaped members 24, 26, 28 is retained to the base member 12. At this time, the base member 12 can be released and it will be retained in position proximate the tripod at a predetermined elevation above the ground surface.

Each knob 46 are turned to tighten the threaded rod 40 which urges the extension member 32a outward, which in turn, urges each leg (15) outward until an outside perimeter of each leg bears against an inside of the U-shaped member 24 or against the second cushion 38, if included.

The knob 46 is sufficiently tightened which places each leg under compression on both an inner and an outer side thereof. Accordingly, each of the three legs (15) are simultaneously prevented from being displaced outward beyond a predetermined distance by the U-shaped members 24, 26, 28. Similarly, the legs (15) cannot be displaced inward because they now also bear tightly against the extension member 32a or the first cushion 36. This eliminates all significant play and makes the tripod far more stable for use.

The U-shaped members 24, 26, 28, as shown, are ideally adapted for use with tripod legs (15) that are either square or rectangular in cross-section. An interior of the U-shaped member is modified, as desired, to include more of a radius (i.e. a curvature) for use with tripod legs that are either circular or oval in shape.

Clearly, the U-shaped members 24, 26, 28 can be modified to ideally match the shape of any preferred type of tripod leg (not shown) other than square or rectangular. Accordingly, the shape of the extension member 32a can similarly be modified. In this manner, the same base member 12 can be used to secure a variety of different types of tripods by having differently shaped U-shaped members 24, 26, 28 (and other modified types, not shown) available for interchange and use.

It is important to note that a direction of a first force vector that urges the first tripod leg 15 outward is shown by a first radial arrow 78 as it applies to the first leg assembly 18. The force vector is disposed on the plane 13 and it passes through a center of the threaded rod 40. The force vector is also perpendicular with respect to the center longitudinal axis 30. Conversely, a force vector that urges the leg 15 inward aligns concentrically with force vector that urges the leg 15 outward and is in an opposite direction as compared to the first radial arrow 78.

Accordingly, the radial tripod stabilizer 10 applies a radial force with respect to the center longitudinal axis 30 to urge the leg 15 either inward or outward.

A direction of a second force vector that urges a second tripod leg (not shown) outward is shown by a second radial arrow 80 (FIG. 1). The second force vector is used to urge the leg of the tripod that is secured by the second leg assembly 20. The second force vector is also perpendicular with respect to the center longitudinal axis 30 and is radially offset away from the first force vector by a magnitude of 120 degrees of arc.

Accordingly, the radial tripod stabilizer 10 applies a radial force with respect to the center longitudinal axis 30 to urge the second leg either inward or outward.

A direction of a third force vector that urges a third tripod leg (not shown) outward is shown by a third radial arrow 82 (FIG. 1). The third force vector is used to urge the leg of the tripod that is secured by the third leg assembly 22. The third force vector is also perpendicular with respect to the center longitudinal axis 30 and is radially offset away from the first force vector by a magnitude of 120 degrees of arc and also away from the second force vector by a magnitude of 120 degrees of arc.

Accordingly, the radial tripod stabilizer 10 applies a radial force with respect to the center longitudinal axis 30 to urge the third leg either inward or outward.

A significant advantage provided by the radial tripod stabilizer 10 is that the radial force vectors keep all forces on the plane 13. This ensures that all of the force that is applied to each of the legs (15) is maximally effective in securing the leg and preventing any play or movement by the leg.

Accordingly, a minimum amount of force applied to compress both sides of each tripod leg results in maximum stability for each of the legs.

Also, there is no tendency whatsoever to cause any of the tripod legs to bow (i.e., to curve) because the force vector that is urging each leg outward aligns concentrically with the force vector that is urging each respective leg inward.

Accordingly, a method of stabilizing a tripod by the use of a balanced outward force vector and a corresponding reaction inward force vector that is radially about a center longitudinal axis to each leg of the tripod is provided.

The outward force vector is caused by an action, specifically by the first, second, and third force vectors. The U-shaped members 24, 26, 28 limit the outward movement of each leg by providing a counter, or opposite reaction force vector that maintains the position of each leg in equilibrium and under compression, with the compression being applied across opposite sides of each leg, when taken in cross-section.

To remove the radial tripod stabilizer 10 from the tripod when its use is no longer required, the knobs 46 are each sufficiently loosened and each of the U-shaped brackets 24, 26, 28 is first urged rearward as shown by arrow 70, then downward as shown by arrow 84 an amount sufficient to compress the leaf spring 72, and then forward as shown by arrow 86 to release the U-shaped bracket 24, 26, 28 from the base member 12. At this time the base member 12 can easily be removed from inside the tripod legs (15).

If the radial tripod stabilizer 10 is to now be used with a different type of a tripod having a different size or shape of leg than that previously described, then the U-shaped brackets 24, 26, 28 are not used and modified U-shaped brackets (not shown) are used that correspond with the size and shape of the legs of the different type of a tripod. An unexpected benefit of instantly and inexpensively adapting the radial tripod stabilizer for use with different sizes and types (i.e., leg cross-sectional shapes) of tripods is provided.

This ability also provides yet another unexpected benefit of making the radial tripod stabilizer 10 usable with virtually all different types of tripods. Accordingly, it can be used with newly manufactured tripods of any size or shape as well as used with already existing types of tripods.

Another unexpected benefit is that the radial tripod stabilizer 10 can be used regardless of how excessively long the legs of the tripod are. The radial tripod stabilizer 10 is simply raised upward a sufficient amount until the tripod's legs converge sufficiently to accept attachment of the radial tripod stabilizer 10. For exceptionally large tripods having exceptionally long legs, the size of the radial tripod stabilizer 10 (i.e., its distance across from one leg assembly to another leg assembly) is increased accordingly. This tends to dispose the radial tripod stabilizer 10 near a center to a longitudinal length of the legs of the tripod, where it is most useful.

Figure 4:
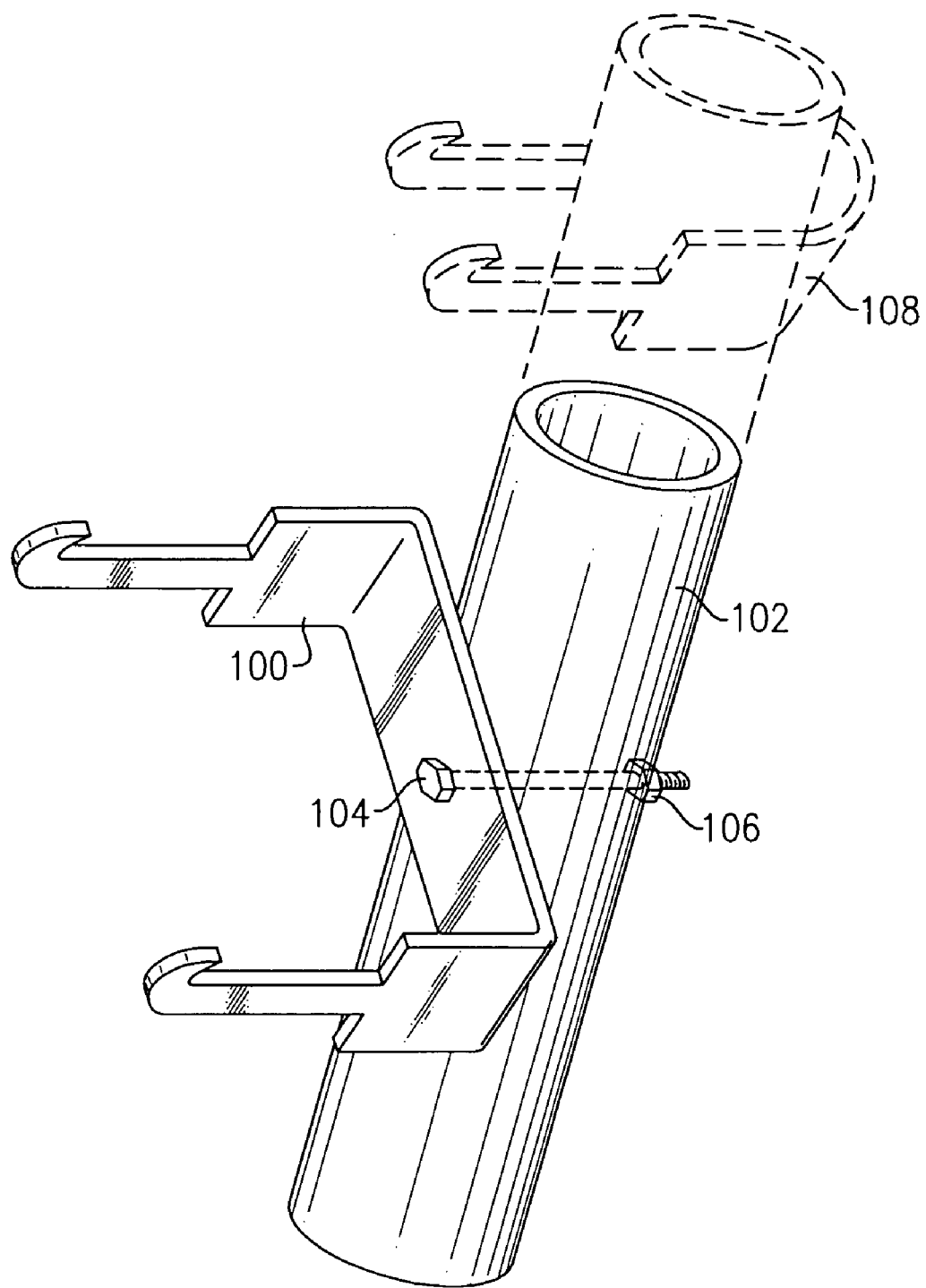
FIG. 4 is a view in perspective of a modified leg member that is attached to a modified tripod leg in place of the U-shaped member.

Additional modifications are also possible. For example, referring to FIG. 4, is shown a modified leg member 100 that is attached to a modified tripod leg 102. The modified tripod leg 102 is round although any cross-sectional configuration is possible. A bolt 104 passes through an opening in the modified leg member 100 and also through opening provided in the modified tripod leg 102 at a preferred location. A nut 106 secures the modified leg member 100 to the modified tripod leg 102.

If preferred the modified leg member 100 could be further modified so that it is welded to the modified tripod leg 102, or it could be formed as an integral part of the modified tripod leg 102. It could also include a round shape and pass around the nut 106 side of the modified tripod leg 102 and be attached thereto by any preferred method.

This would eliminate use of the U-shaped members 24, 26, 28 because three of the modified leg members 100 would replace them.

Or, consistent with the use described earlier, a rounded modified detachable U-shaped member 108 (dashed lines, FIG. 4) that is not attached in any way to the modified tripod leg 102 could pass around a rear of the modified tripod leg 102 (i.e., the nut 106 side) and be detachable therefrom. This illustrates how the shape of the modified tripod leg 102 could be varied to include any different cross-sectional shape or diameter or length for the modified tripod leg 102 and wherein the radial tripod stabilizer 10 is adapted for use.

In particular, the same radial tripod stabilizer 10 can be used interchangeably with any combination of the detachable U-shaped members 24, 26, 28, the modified detachable U-shaped members 108, or the modified leg members 100.

Therefore, the same base member 12 can be used to secure any tripod having any preferred type, size, or configuration of tripod leg, from which the base member 12 can be detached and immediately used with a different type of tripod having a similar or different type, size, or configuration of tripod leg providing the appropriately modified type of the U-shaped members 24, 26, 28, the modified detachable U-shaped members 108, or the modified leg members 100 are used with each different tripod configuration.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A radial tripod stabilizer for stabilizing a tripod structure, comprising
    (a) a base member that includes a generally planar shape of any preferred thickness, and wherein said base member includes a plane passing through a center thereof, and including a center longitudinal axis that passes through a center of the base member and wherein said center longitudinal axis is perpendicular with respect to said plane;
    (b) three leg assemblies that are each attached to the base member, wherein each of said three leg assemblies is in an equidistant and spaced-apart radial relationship with respect to a remaining two of said leg assemblies, and wherein each leg assembly is adapted to cooperate with one of three legs of a tripod, and wherein each leg assembly includes a leg member that is detachably-attachable with respect to the base member and which generally includes a U-shape thereto;
    (c) wherein each leg member is adapted to prevent a leg of said tripod from extending outward with respect to said center longitudinal axis beyond a predetermined distance, and wherein each of said leg assemblies includes means for urging a corresponding one of said tripod legs away from said center longitudinal axis, and wherein said means for urging each of said legs is disposed on said plane, and wherein each of said leg members is disposed on said plane;
    (d) wherein said means for urging includes an extension member and wherein said extension member is adapted to be urged radially away from said center longitudinal axis, and wherein said extension member is attached to a first end of a threaded rod, and wherein said first end of said threaded rod is adapted to rotate about a center longitudinal axis of said threaded rod with respect to said extension member, and wherein said threaded rod includes external screw threads that are adapted to engage with corresponding screw threads of a threaded opening that is provided in said base member, and wherein said threaded rod is disposed on said plane, and wherein when said threaded rod is rotated about said center longitudinal axis of said threaded rod in a first direction of rotation, and wherein said extension member bears against an inside surface of said one of said tripod legs and urges said one of said tripod legs radially away from said center longitudinal axis until an outside surface of said one of said tripod legs contacts an inside surface of a corresponding one of said leg members when said one of said tripod legs reaches said predetermined distance from said center longitudinal axis, and wherein said corresponding one of said leg members prevents any further outward movement by said one of said tripod legs thereby stabilizing said one of said tripod legs; and
    (e) wherein each of said leg assemblies is disposed along a longitudinal length of each of said three legs of said tripod at a location that is intermediate an upper end and a lower end of each of said three legs.

2. The radial tripod stabilizer of claim 1 wherein said leg member is detachable with respect to said tripod leg.

3. The radial tripod stabilizer of claim 1 wherein said leg member is fixedly attached to said tripod leg.

4. The radial tripod stabilizer of claim 1 wherein said leg member includes a shape for a portion thereof that corresponds with a cross-sectional shape of said tripod leg.

5. The radial tripod stabilizer of claim 1 wherein said leg member includes a rectangular shape for a portion thereof.

6. The radial tripod stabilizer of claim 1 wherein said leg member includes an arcuate shape for a portion thereof.

7. The radial tripod stabilizer of claim 1 wherein said leg member includes a round shape for a portion thereof.

8. The radial tripod stabilizer of claim 1 wherein said leg member includes an angle that corresponds with an angle that said tripod leg is disposed at during use.

9. The radial tripod stabilizer of claim 8 wherein said leg assembly includes a spring and wherein said spring applies a force sufficient to urge said leg member into a first position of cooperation with said base member and wherein said leg member is retained to said base member when said leg member is disposed in said first position of cooperation.

10. The radial tripod stabilizer of claim 1 wherein said leg member includes a cushion material intermediate a portion of said leg member and said tripod leg.

11. The radial tripod stabilizer of claim 1 wherein said leg member includes a hook that is adapted to cooperate with said leg assembly sufficient to prevent said leg member from being urged away from said base member.

12. The radial tripod stabilizer of claim 1 wherein said extension member includes an angle that corresponds with an angle that said tripod leg is disposed at during use.

13. The radial tripod stabilizer of claim 1 wherein said extension member includes a cushion material intermediate a portion of said extension member and said tripod leg.

14. The radial tripod stabilizer of claim 1 including a knob that is attached to an opposite second end of said threaded rod.

15. The radial tripod stabilizer of claim 1 wherein said extension member includes a channel member that is attached at one end thereof to said extension member and wherein an opposite end of said extension member is disposed in said base member and wherein a portion of said extension member is adapted to slide into said base member and out of said base member a predetermined amount.

16. The radial tripod stabilizer of claim 15 wherein said extension member includes means for preventing it from rotating about a center longitudinal axis thereof when said extension member is disposed in said base member.

* * * * *